Dec. 26, 1961     J. C. ROGERS     3,014,469
INTERNAL COMBUSTION ENGINE
Filed July 2, 1959     5 Sheets-Sheet 1

JOHN G. ROGERS
INVENTOR

BY *C. A. Snow & Co.*
ATTORNEYS.

Dec. 26, 1961     J. C. ROGERS     3,014,469
INTERNAL COMBUSTION ENGINE
Filed July 2, 1959     5 Sheets-Sheet 2
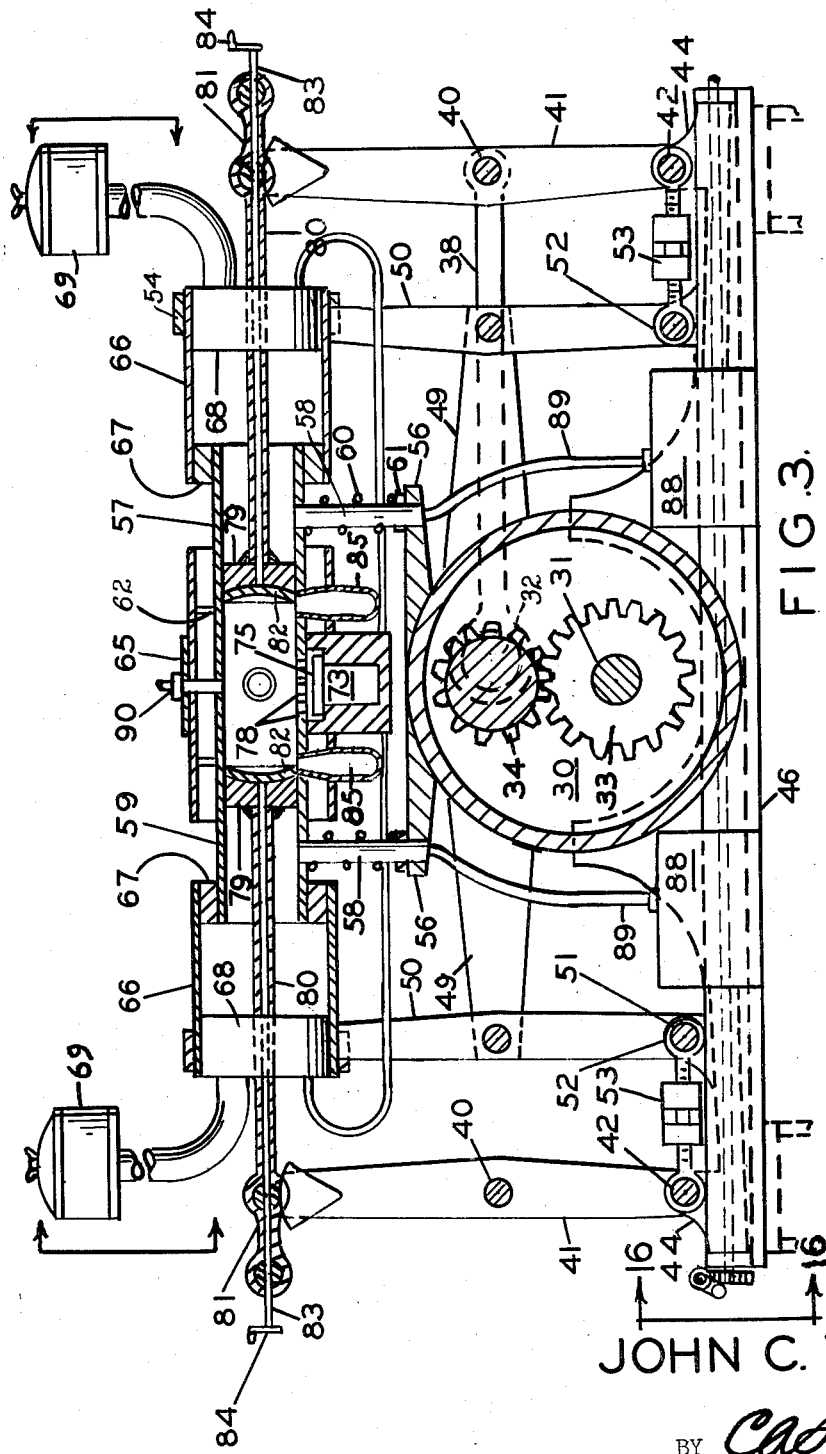
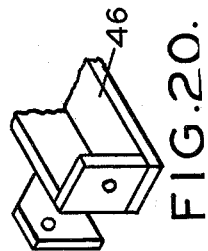
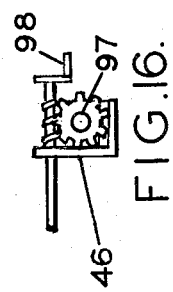
JOHN C. ROGERS
INVENTOR
BY *C.A.Snow &Co.*
ATTORNEYS.

Dec. 26, 1961   J. C. ROGERS   3,014,469
INTERNAL COMBUSTION ENGINE
Filed July 2, 1959   5 Sheets-Sheet 3
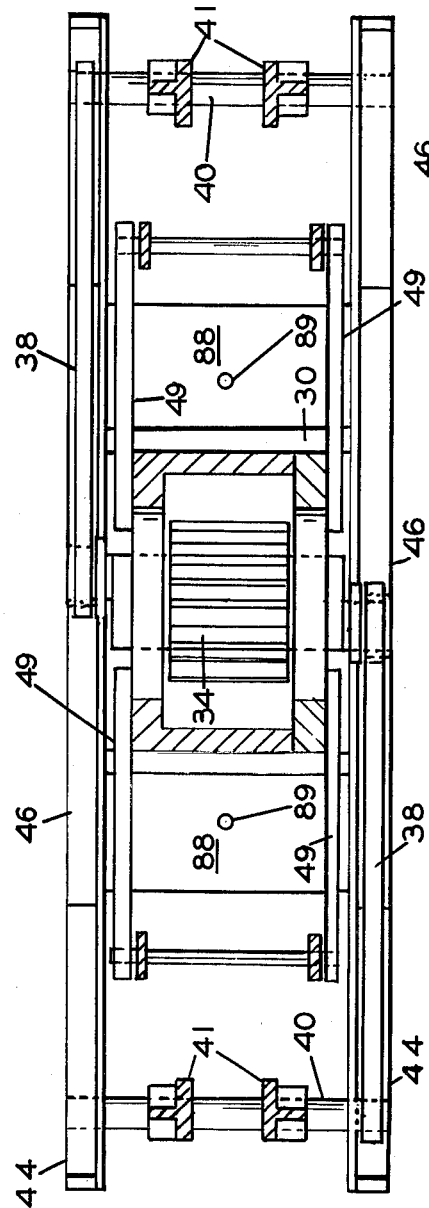
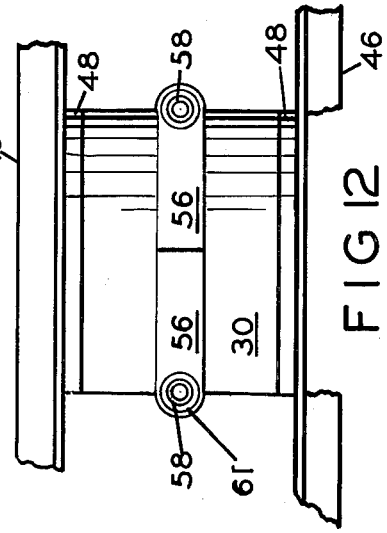
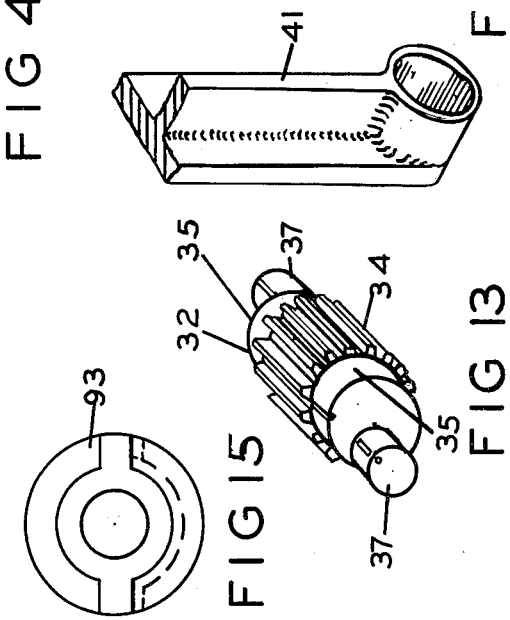
JOHN C. ROGERS
INVENTOR
BY *CA Snow + Co.*
ATTORNEYS.

Dec. 26, 1961 J. C. ROGERS 3,014,469
INTERNAL COMBUSTION ENGINE
Filed July 2, 1959 5 Sheets-Sheet 4
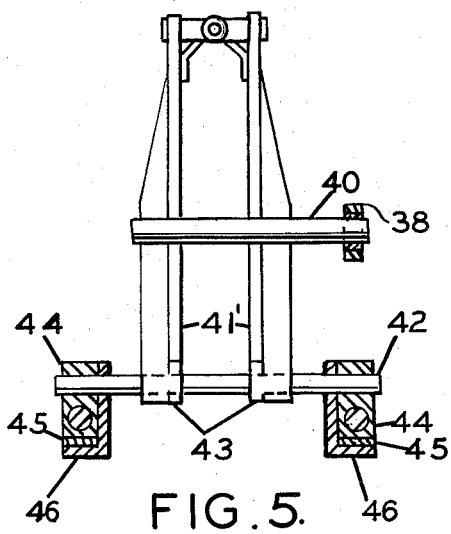
FIG. 5.
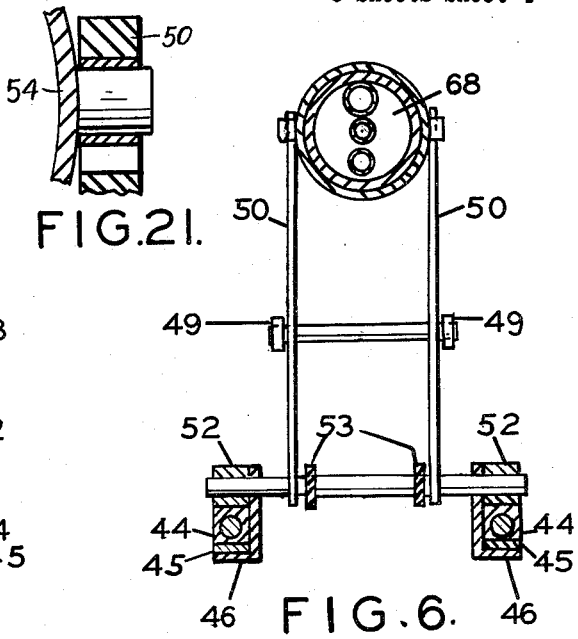
FIG. 21.
FIG. 6.
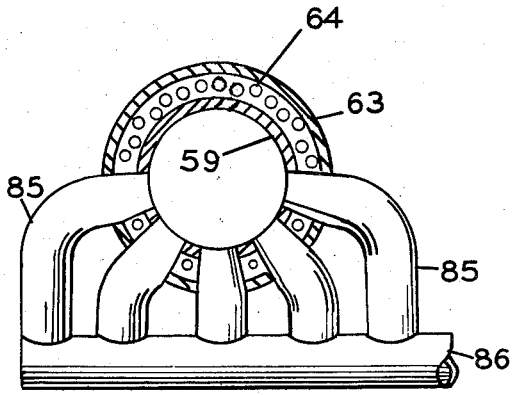
FIG. 7.
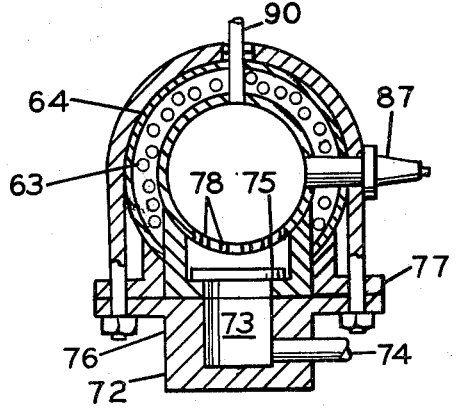
FIG. 9.
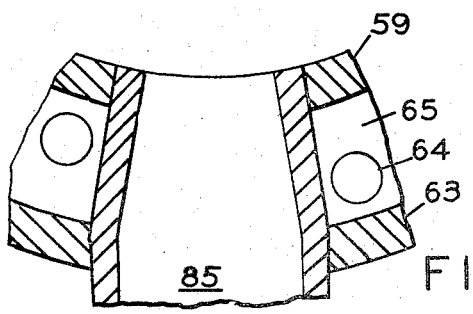
FIG. 8.
JOHN C. ROGERS
INVENTOR
BY *CA Snowles*
ATTORNEYS.

Dec. 26, 1961     J. C. ROGERS     3,014,469
INTERNAL COMBUSTION ENGINE
Filed July 2, 1959     5 Sheets-Sheet 5
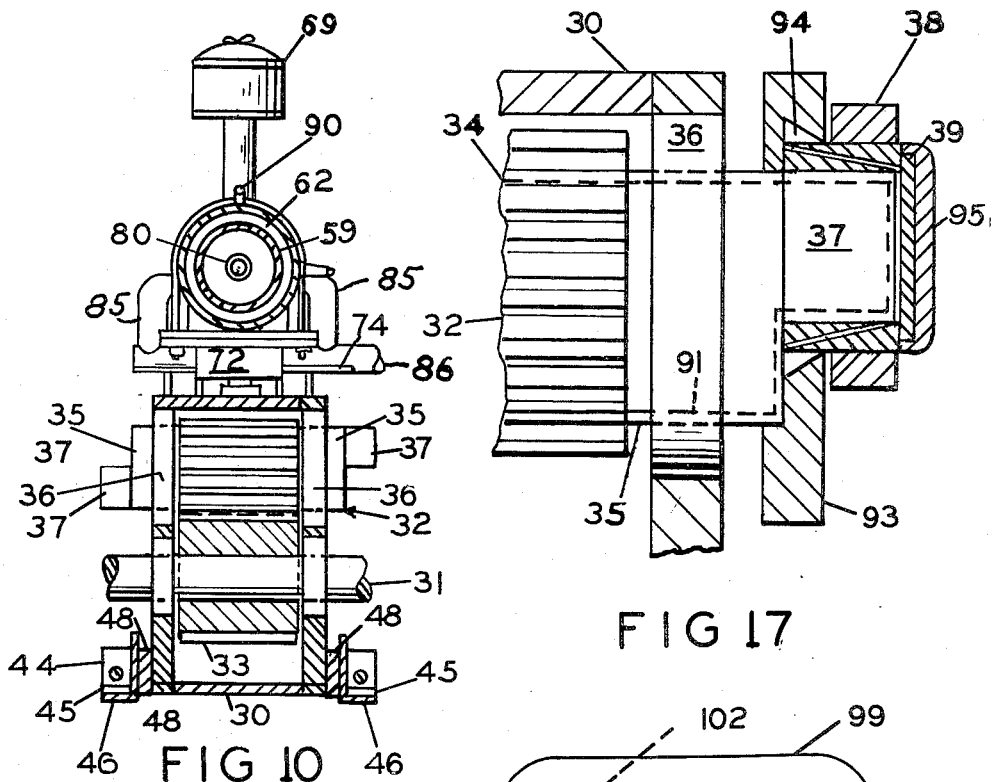
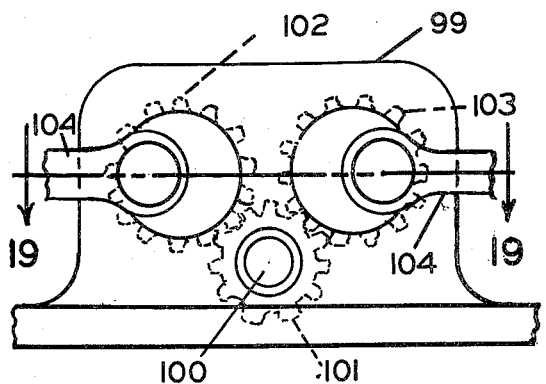
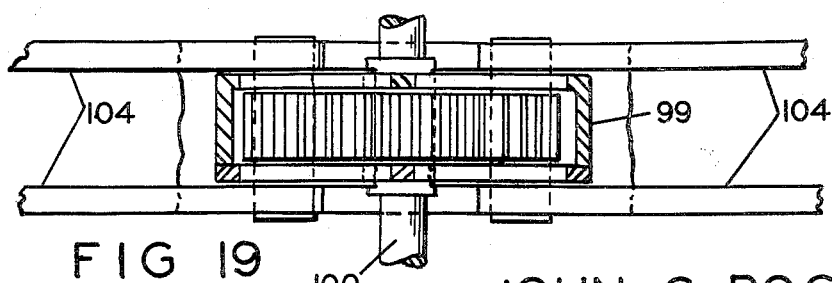
JOHN C ROGERS
INVENTOR
BY *C A Snow & Co.*
ATTORNEYS.

United States Patent Office 3,014,469
Patented Dec. 26, 1961

3,014,469
INTERNAL COMBUSTION ENGINE
John C. Rogers, 423 Quitman St., Pittsburg, Tex.
Filed July 2, 1959, Ser. No. 824,612
1 Claim. (Cl. 123—51)

This invention relates to internal combustion engines, a primary object of the invention being to provide an engine of this character embodying a floating cylinder wherein the ends of the cylinder are open and maintained in proper alignment by means of vertical tubes attached to underside of cylinder or cylinder hanger.

Another object of the invention is the provision of yieldable supporting mechanism for the vertical tubes, and cylinder, eliminating the necessity of bolting the cylinder to the engine crank case, thereby providing an engine construction which may be dismantled and conveniently repaired with a minimum amount of effort.

A further object of the invention is to provide a linkage connection between the pistons and connecting rods, which is so constructed and arranged that complete replacement of the cylinder may be readily accomplished.

Another object of this invention is to provide an internal combustion engine with scrapers in one end of each piston so that any carbon deposited on the piston head may be removed without the necessity of dismantling the engine.

Another object of this invention is to provide an internal combustion engine that has no fly-wheel, such as in the conventional engine, thereby reducing the weight and cost of the engine.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

FIG. 3 is a sectional view taken substantially along line 3—3 of FIG. 2 as viewed in the direction indicated by the arrows.

FIG. 4 is a sectional view taken substantially along line 4—4 of FIG. 1 as viewed in the direction indicated by the arrows.

FIG. 5 is a sectional view taken substantially along line 5—5 of FIG. 1 as viewed in the direction indicated by the arrows.

FIG. 6 is a sectional view taken substantially along line 6—6 of FIG. 1 as viewed in the direction indicated by the arrows.

FIG. 7 is a sectional view taken substantially along line 7—7 of FIG. 1 as viewed in the direction indicated by the arrows.

FIG. 8 is an enlarged detail sectional view of a fragment of FIG. 7.

FIG. 9 is a sectional view taken substantially along line 9—9 of FIG. 1 as viewed in the direction indicated by the arrows.

FIG. 10 is a sectional view taken substantially along line 10—10 of FIG. 1 as viewed in the direction indicated by the arrows.

FIG. 12 is a sectional view taken substantially along line 12—12 of FIG. 1 as viewed in the direction indicated by the arrows.

FIG. 13 is a perspective view of the crank shaft of this invention showing how the gear teeth are cut directly on the crank shaft.

FIG. 14 is a perspective view of the lower end of one of the rocker arms of this invention.

FIG. 15 is a front view of one of the counterbalances of this engine.

FIG. 16 is an end view of a detail of this invention taken substantially along line 16—16 of FIG. 3 as viewed in the direction indicated by the arrows.

FIG. 17 is an enlarged fragmentary sectional view of the assembly of the counterbalance and connecting rod on the crank shaft.

FIG. 18 is a side view of an optional form of arrangement of the crank case and drive mechanism.

FIG. 19 is a sectional view taken substantially along line 19—19 of FIG. 18 as viewed in the direction indicated by the arrows.

FIG. 20 is a perspective view of one end of one of the base angles.

FIG. 21 is an enlarged sectional view taken substantially along line 21—21 of FIG. 1 as viewed in the direction indicated by the arrows.

Before proceeding with a description of the construction of this invention, it will be well to note that the entire cooling system, all of the fuel lines, most of the lubricating system and the entire ignition system, with the exception of the spark plug, has been omitted from the drawings, as these components are well known and thoroughly understood by those experienced in the art.

It will also be well to remember that a part is frequently left off in a view, particularly if it has no relation to the detail under discussion, or if, as in a sectional view, the part or parts are beyond a given cutting plane. Typical examples of this lack of details being shown beyond a cutting plane are to be found in FIGS. 5, 6, 7 and 9 of the drawings.

Figure 1:
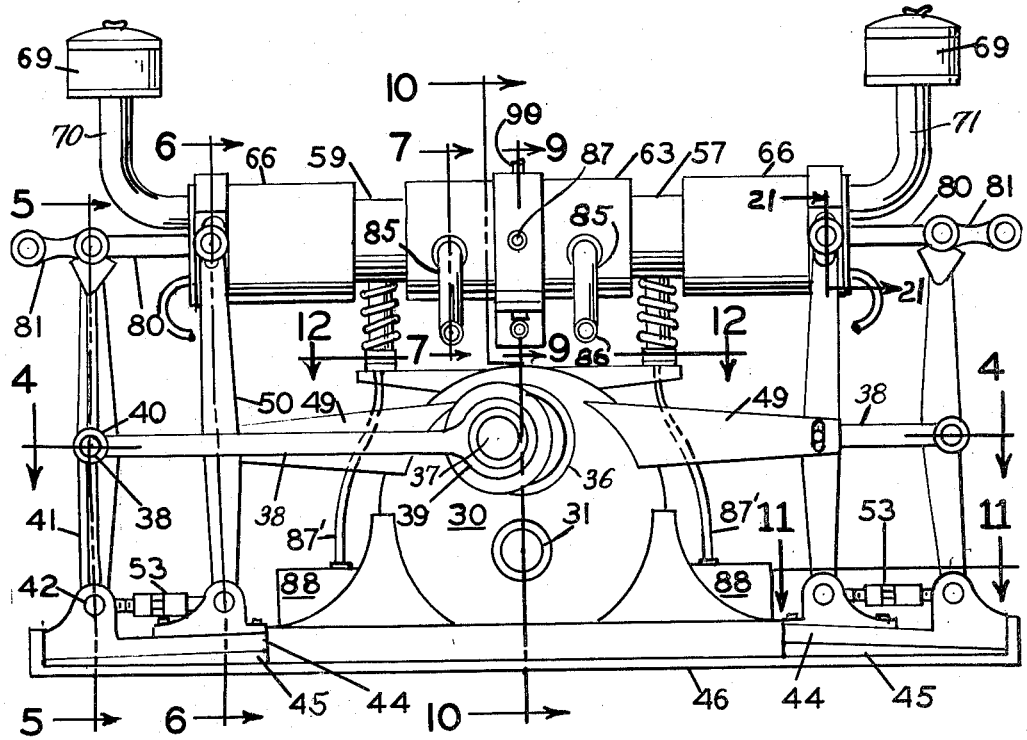
FIGURE 1 is a side view of this invention.
Figure 2:
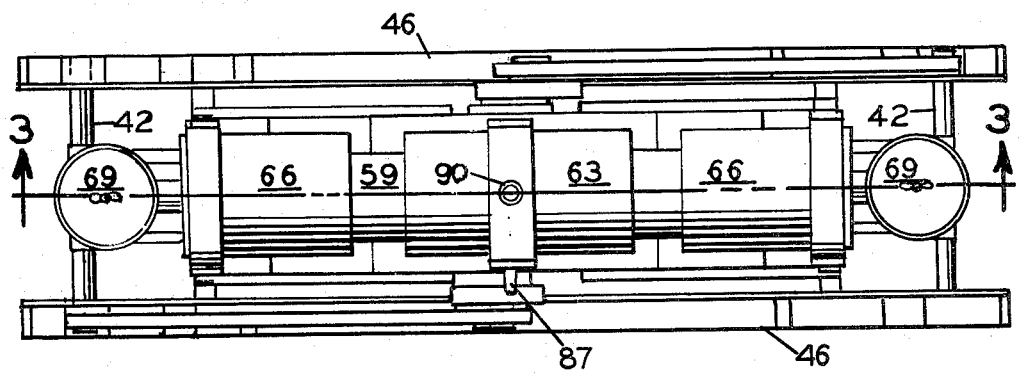
FIG. 2 is a top plan view of this invention.
Figure 11:
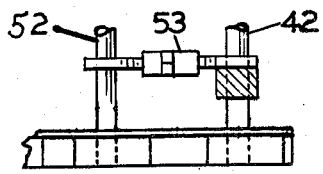
FIG. 11 is a sectional view taken substantially along line 11—11 of FIG. 1 as viewed in the direction indicated by the arrows.

Having reference now to the drawings in detail, and in particular to FIGS. 1 and 3, there is generally indicated by the reference character 30, a crank case containing a drive shaft 31 which is geared to a crank shaft 32 by means of a large gear 33 and its mating pinion 34 which is of novel construction in that its teeth are cut directly on the crank shaft 32 between journals 35 which rest in bearings 36 in each side of the crank case 30. The crank shaft extends beyond each journal in the form of diametrically opposed crank pins 37 see FIG. 13.

A main connecting rod 38 having a bearing 39 in the opening in its enlarged end is rotatably mounted on the crank pin. It is of course understood that this particular engine has two connecting rods, one on each crank pin, or one on each side of the crank case. The small end of each connecting rod is pivotally connected to a rod 40 which in turn is supported by rocker arm 41 as clearly shown in FIGS. 1, 3 and 5 of the drawings.

The rocker arms 41 are pivotally supported in a vertical position by a rocker arm support rod 42 passing through the lower end 43 of each of the stated rocker arms 41. The rocker arm support rod is parallel to the rod 40 and is pivotally supported by a bearing block 44 which rests on a tapered base plate 45, which in turn rests on a base angle 46.

The stated base angles 46 are rigidly secured at midpoint to the crank case 30 which is given additional support by gusset plates 47, as clearly shown in FIGS. 1 and 3 of the drawings.

Although a filler member 48 is shown between the base angle 46 and the crank case 30, in FIG. 10 of the drawings, this filler may be omitted if desired.

It is obvious from the foregoing that the crank case 30 with the base angles 46, form the supporting structure for the cylinder and other vital parts of this internal combustion engine.

A pair of horizontal beam-like members 56 is secured to the top of crank case 30, for the support of cylinder assembly 57 by means of vertical tubes 58 that have one of the respective ends attached to the underside of a cylinder 59, while the other end of each tube 58 passes slidably through an opening in the outer end of the beamlike member 56. Coil compression springs 60 on tubes 58 actually support the cylinder assembly, while a collar 61 having a set screw, not shown in the drawings, gives adjustable control of the amount of vertical movement of the cylinder assembly.

The cylinder 59 is cooled by a water jacket 62 which may be of any desired construction, although the form herein suggested and illustrated in the accompanying drawings embodies a large tubular member 63 in which the cylinder is held in place by a plurality of water cooling tubes 64 see FIG. 9, which are held in place by any suitable means such as by plate 65 having openings for the tubes, as typically shown in FIGS. 3, 7 and 9 of the drawings. With the exception of the aforementioned water jacket and its cooling tubes 64, no other part of the cooling system for this engine is shown in the drawings as it is not considered to be a part of this present invention.

The cylinder 59 contains two diametrically opposed pistons 79, each having a concave head and a hollow connecting rod 80 rigidly secured to its rear end. These connecting rods are considerably longer than those used in conventional engines as they have to pass through the entire length of the tubular housing 66 to terminate in a fitting 81 better shown by FIGURE 3. The swivel connection of the rocker arm 41 with the hollow connecting rod 80 is novel, since it is so constructed that the stated connecting rod 80 will ride on an arch-like member 41' secured to the rocker arm 41 on which it is attached by means shown in FIG. 5 of the drawings.

A new and novel feature of this invention is the installation of a scraper 82 in the head of each piston 79 to which it is contoured in order that it may scrape and remove any carbon deposited on the piston heads. A scraper rod 83 is secured to the rear of each scraper 82 and extends through connecting rod 80 and fitting 81 to a hand crank 84 which is shown only in FIG. 3 of the drawings.

The exhaust system of this engine is relatively simple, as it consists of two sets of exhaust stacks 85 radially spaced around the lower half of the cylinder as viewed from the end. Each exhaust stack of each set terminates in a common exhaust pipe 86. The exhaust stacks and pipes have been left out of the drawings for the previously stated reasons of clarity.

The only part of the ignition system shown in the drawings is a spark plug 87 located in the longitudinal center of the cylinder 59. The means for supplying the electric current is old, and not a part of this present invention.

The counterweight 93 is secured directly to each end of the main crank shaft 32, as clearly shown in FIG. 17 of the drawings. The counterweight is circular as viewed from the side (see FIG. 15), and contains a circular recess 94 whose side is inclined, as shown in FIG. 17. A cap 95 holds the connecting rod bearing 39 and the main crank shaft in which it is secured, in place, while a dust cover 96 is secured over the cap 95 by any suitable means, not shown in the drawings.

Referring again to FIG. 3, it will be seen that longitudinal adjustment of the bearing block 44 and the attached members the construction of which and purposes have already been described, can be made by turning crank handle 98 which is geared to two screws 97 at one end of the base angle assemblies, increasing or decreasing the compression ratio as desired, and the words "base angle assemblies" are used for that part of this invention shown in a portion of FIG. 3 (lower left-hand corner), and by FIGS. 16 and 20, the latter being a perspective view of one end of base angle 46 and associated members which have not been given reference characters. For reasons of clarity the threads have not been shown on adjustment screws 97, since the screws have been drawn in the necessary hidden lines in this view.

The internal combustion engine of the instant invention is a two-cycle engine that will develop approximately 92 horsepower at 1,000 r.p.m. A slight variation is made in drive mechanism when the engine is to develop over a 100 horsepower; namely, instead of each piston having one main connecting rod 38 the crank case is modified as at 99 in FIGS. 18 and 19, and a drive shaft 100 having a gear 101 will engage two gears, 102 and 103, which form a part of a crank shaft, the same as previously described crank shaft 32. Therefore, the larger horsepower engine not only has two crank shafts, but also two main connecting rods 104 per cylinder, as is clearly shown in FIG. 19 of the drawings.

The operation of the engine does not require detail description, as it will be obvious to those experienced in the art.

This engine is reversible, that is, the direction of rotation of the drive shaft 31 is reversed by changing the position of the ignition timer, as is well understood by those versed in the art. The ignition timer is not shown in the accompanying drawings, since it is not a part of the invention, and both its form and method of application to the engine are well known by those familiar with internal combustion engines. It is to be realized that an engine having a drive shaft whose direction of rotation is reversible will be ideally suited for marine work or any other work where a reverse direction of power is desired.

What is claimed is:

In an internal combustion engine of the opposed piston type, the combination of a floating cylinder in which pistons operate, a crank case, horizontal beam like members mounted on said crank case, said beam like members having openings, means for mounting said cylinder on said crank case, said mounting means embodying a pair of vertical tubes extending downwardly from said cylinder and slidable through said openings formed in said beam like members, coiled compression springs encompassing said vertical tubes, normally holding said cylinder in a horizontal position, a main drive shaft gear within said crank case for transmitting movement of said pistons to said drive shaft, crank pins connecting rods connected between said crank pins and pistons for effecting movement of said pistons within said cylinders, and means for supplying fuel to said cylinders.

References Cited in the file of this patent

UNITED STATES PATENTS

| | | |
|---|---|---|
| 639,686 | Parks | Dec. 19, 1899 |
| 1,286,122 | Sargent | Nov. 26, 1918 |
| 1,578,476 | Slaght | Mar. 30, 1926 |
| 2,056,080 | Smith | Sept. 29, 1936 |
| 2,113,990 | Laraque | Apr. 12, 1938 |
| 2,134,811 | Church | Nov. 1, 1938 |
| 2,332,618 | Wagner et al. | Oct. 26, 1943 |
| 2,381,465 | Schroder | Aug. 7, 1945 |
| 2,398,640 | Hickey | Apr. 16, 1946 |